United States Patent [19]

Bowles

[11] 4,085,733
[45] Apr. 25, 1978

[54] ROOF-MOUNTABLE CHAMBER AND CONDUIT DEVICE FOR SOLAR HEAT COLLECTING APPARATUS

[76] Inventor: Vernon O. Bowles, 342 Third Ave. N., Naples, Fla. 33940

[21] Appl. No.: 718,565

[22] Filed: Aug. 30, 1976

Related U.S. Application Data

[63] Continuation-in-part of Ser. No. 676,156, Apr. 12, 1976.

[51] Int. Cl.² ............................................. F24J 3/02
[52] U.S. Cl. .................................................. 126/271
[58] Field of Search ............... 126/270, 271; 237/1 A; 137/590

[56] References Cited

U.S. PATENT DOCUMENTS

| 907,504 | 12/1908 | Kane | 137/590 |
|---|---|---|---|
| 1,157,643 | 10/1915 | Kuhn | 137/590 |
| 1,753,227 | 4/1932 | Wheeler et al. | 126/271 |
| 2,342,211 | 2/1944 | Newton | 273/1 A |

FOREIGN PATENT DOCUMENTS

| 529,163 | 11/1921 | France | 126/271 |
|---|---|---|---|
| 724,819 | 5/1932 | France | 126/271 |

*Primary Examiner*—Carroll B. Dority, Jr.
*Attorney, Agent, or Firm*—Albert C. Johnston; Gerard F. Dunne

[57] ABSTRACT

A combined chamber and conduit device to be mounted on a roof at an elevation higher than an assembly of one or more solar radiation receptors comprises a container having a depending well portion to extend through an opening in the roof or like support structure, which container forms part of a liquid flow circuit extending from the receptors and to a heat exchange zone beneath the roof for transferring heat from the solar heated liquid, serves for filling the receptors and the flow circuit with liquid which it holds under low hydrostatic pressure while letting the liquid expand and contract with temperature changes, and has lengths of tubing extending through the well portion and the container side wall for return flow of liquid to the receptors and for displacements of gaseous fluid between a cover space over the receptors and fluid dessicating and expansion chambers beneath the roof.

5 Claims, 4 Drawing Figures

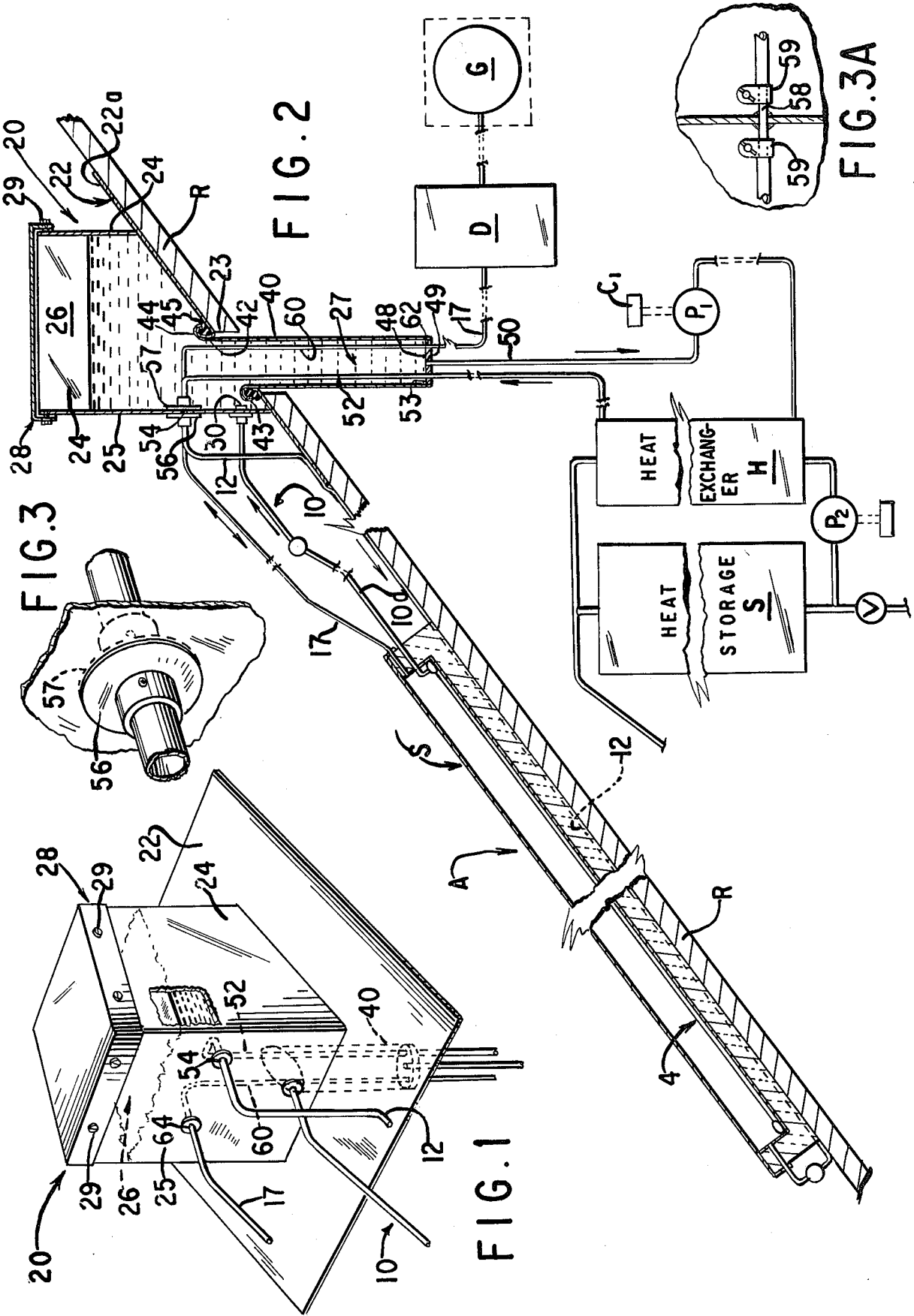

ROOF-MOUNTABLE CHAMBER AND CONDUIT DEVICE FOR SOLAR HEAT COLLECTING APPARATUS

This application is a continuation-in-part of my co-pending U.S. patent application Ser. No. 676,156 filed Apr. 12, 1976, the disclosure of which is incorporated herein by reference.

The said copending application discloses an apparatus for collecting solar heat which makes use of liquid-containing radiation receptors each mounted in a heat insulating support on a roof or other support structure across the path of sunlight and each forming a shallow chamber, extensive in exposed surface area, that is kept completely filled with heat receptive liquid confined to a thin layer under a low hydrostatic pressure. The radiation receptors are connected in a flow circuit by conduit means through which liquid heated in them is passed from their upper ends to a heat exchange zone and thence back into their lower ends.

The receptors and their flow circuit are kept filled with the liquid from a liquid-expansion chamber which is connected with the conduit means and located at an elevation slightly higher than the liquid outflow conduits at the upper ends of the receptors. Each radiation receptor is also provided with a substantially sealed cover space between its front surface and a transparent cover sheet overlying it, which space communicates through tubing with a gas-expansion or surge chamber and a dessicant container so that the air or other gaseous atmosphere in the cover space is able to expand or contract with temperature changes without collecting moisture that would fog the cover sheet.

The radiation receptors typically are to be installed upon the roof of a building in which water heating or space heating needs will be served by the apparatus, with a heat exchanger and a gas-expansion chamber located inside the building beneath the roof. The installation of the apparatus thus requires multiple conduits interconnecting its components mounted on the roof and those beneath the roof.

It is desirable that the installation of the apparatus be feasible in a simple manner and with minimal need for openings through the roof to accommodate the conduits, and also that means be conveniently assessible to a user of the installation for filling the receptor flow circuit with the heat collecting liquid and limiting the hydrostatic pressure in the radiation receptors.

The principal object of the present invention is to provide a combined liquid filling and expansion chamber and conduit device by which these desirable attributes are realized.

According to the invention, a roof-mountable chamber and conduit device is provided which enables a single, accessible location to serve both for filling the radiation receptors and their flow circuit with the heat collecting liquid and for maintaining the liquid in them under low hydrostatic pressure, and which also enables a single opening through a roof to suffice for an installation of the apparatus by forming or accommodating portions of the conduits required for conducting fluids through the roof between the radiation receptor assembly and components of the apparatus beneath the roof.

A combined chamber and conduit device according to the invention comprises a liquid impermeable base member, such for example as a flashing sheet of weather resistant metal or plastic, adapted to be mounted on a support structure such as a roof over an opening therethrough, and a side wall standing upright from this base member encloses a space over it to form a container for filling the radiation receptor assembly and its flow circuit with liquid and holding some of the liquid expansibly at an elevation which maintains the required low hydrostatic pressure in the radiation receptor or receptors. A tubular extension communicating with the container space depends from the base member so as to form a well portion of the container extending through the roof opening, and this extension has an outlet from its lower end for connection with a part of the conduit means beneath the roof. Also, an inlet is provided in the container side wall for connection with a part of the conduit means leading from the receptor assembly, so that the liquid heated in the radiation receptor(s) passes from the top of said receptor(s) upwardly into the device and thence downward from it through the depending well portion for delivery of collected solar heat into a heat exchanger beneath the roof. The device thus serves for initially filling the receptor flow circuit, for venting air or vapors therefrom, and for fixing the hydrostatic pressure in the system during operation; and it constitutes an actual part of the conduit means, embodying appropriate fluid surge and expansion capability, for conducting the heated liquid between the receptor assembly and the heat exchanger.

As a further feature of the invention, the device also accommodates other portions of the conduits, or tubing, provided for conducting fluid between components of the apparatus respectively over and beneath the roof. For this purpose, at least one length of tubing and usually two such lengths are arranged to extend along the tubular extension, or well portion, of the container from its lower end and thence through the container space and its side wall for connection with parts of the conduit means or tubing above and beneath the roof. One such length of tubing forms a part of the conduit means for conducting liquid from the heat exchanger back through the roof opening for return into the lower end of the radiation receptors. Another length of tubing forms part of a conduit for conducting gaseous fluid between sealed cover space(s) over the receptor(s) through a desiccation device and to a surge chamber, both being located beneath the roof. The latter length of tubing may also be employed as a conduit or protective housing for a length of an electrical conductor or other signal conducting means extending through the roof for connecting a temperature sensor at the radiation receptor(s) with means for activating a pump located in a part of the conduit means beneath the roof for circulating the heat collecting liquid when its temperature exceeds a predetermined minimum level.

Each of the lengths of tubing can be sealed in a respective port in the container side wall in any of various ways. A short piece or stub of tubing may be sealed in the port and connected by ring type tubing clamps with a run of the tubing length inside the container and with another tubing run or conduit outside the container. In another arrangement, the tubing length may extend as a single piece through the port, with rigid flanges surrounding it at opposite sides of said side wall and an adhesive sealing composition filling crevices between the flanges and the tubing portion in the port.

The foregoing and other objects, features and advantages of the invention will be further apparent from the following detailed description and the accompanying drawings of an illustrative embodiment. In the drawings:

FIG. 1 is a perspective view of a roof-mountable chamber and conduit device embodying the invention;

FIG. 2 is a view, partly in cross-section and partly diagrammatic, showing the device of FIG. 1 in place on a roof in association with a radiation receptor assembly, with diagrammatic indications of the connections effected through the device; and FIGS. 3 and 3A are detailed views of means for fixing and sealing a portion of a tubing length in a port through the side wall of the device.

The roof-mountable chamber and conduit device 20 as shown in FIG. 1 is adapted for holding in full supply and for limiting the hydrostatic pressure of the heat collecting liquid employed in the radiation receptor assembly and the liquid flow circuit of an apparatus for collecting solar heat such as that disclosed in said copending application Ser. No. 676,156. In the illustrated form of such apparatus (FIG. 2), a radiation receptor assembly A, which includes at least one and usually several liquid-filled radiation receptors such as the one illustrated at 4 in FIG. 2 is mounted on a suitable support structure, such as a sloping roof R, so as to confront the path of sunlight from which heat is collected in a thin liquid layer held against the upper panel of each receptor.

Each receptor 4 has an outlet or conduit branch such as 10a extending from its upper end into a conduit 10 for conducting liquid heated in the receptor to a heat exchange zone, which in this case is a liquid-to-liquid heat exchanger H located beneath the roof R, and from the heat exchanger the liquid flows back through a conduit 12 and via a branch thereof such as 12a into the lower end of the receptor.

The chamber and conduit device 20 serves as a roof-mounted container and roof passageway forming part of the conduit means for conducting liquid between the receptor assembly and the heat exchanger, and serves also for filling the receptors and their flow circuit while venting same during initial filling, and for keeping the liquid in them under a limited low hydrostatic pressure.

As shown in FIGS. 1 and 2, the device 20 is constituted principally by a base member or flashing sheet 22, a side wall 24 standing upright from the base member so as to form over it a container for the heat collecting liquid, and a tubular extension or sleeve 40 forming a well portion 27 of the container which communicates with the container space or chamber 26 bounded by the side wall 24 and extends downwardly from the base member 22 through an opening 23 in the roof R. The opening 23 typically is formed at a location slightly more elevated, for instance about 1 to 3 feet higher, than that of the top of receptor assembly A.

The base member 22 typically is a flat sheet of metal or plastic flashing material. For example, it may be a sheet of 20 gauge aluminum or copper, or of polyvinyl chloride sheet material, approximately 20 inches square. The side wall 24 has its lower edge secured to the sheet 22 by a leak-proof joint about the chamber space 26 which is located centrally over the base member. The container thus formed may have, for example, four sides each of about 8 inches in lateral extent, with wide marginal portions 22a of the base member extending away from the side wall to overlie and be sealed onto the roof surface about the opening 23.

The roof surface or other support structure ordinarily will be sloped at a pitch reasonably appropriate to the solar latitude of the heat collecting installation. The side wall 24 preferably stands upright with the base member 22 at a corresponding pitch, so that the slope of the base member will fit the slope of the support structure. The side wall therefore has a longer wall portion or side 25 bordering a lower region of the container space or chamber 26.

The tubular extension or sleeve 40 communicates with the container space 26 through an opening 42 formed in the base member, preferably at a location near the longer side wall portion 25, i.e. in a lowermost region of the container space. The upper end of the tubular extension fits into the opening 42 and is fixed and sealed to the base member about this opening. For instance, the extension 40 may be a rigid sleeve of about 2 inches in diameter, made for example of aluminum or copper or PVC sheeting, having its upper end soldered, welded, crimped or, in the use of PVC, heat sealed to the base member. Or, as indicated in FIG. 2, a flange 43 on the upper end of a metal tube 40 may be interlocked by crimping with a flange 44 bordering opening 42, with a sealing beading ring 45 of Neoprene or other suitable sealing material compressed between the flanges.

The lower end of the tubular extension 40 is closed by an end piece or bottom wall 48 formed centrally with an outlet opening 49 through which liquid in the well portion 27 of the container will fill and flow downward through a conduit 50 having its end sealed in the outlet opening 49. Conduit 50 may be, for instance, a length of polyvinyl chloride (PVC) tubing having an internal diameter of about ⅜ inch. This conduit as indicated in FIG. 2, leads through a low pressure pump $P_1$ to the shell side of the heat exchanger H.

The longer or front side 25 of the container side wall 24 is provided in a lower region thereof with an inlet opening 30 in which an end of the conduit 10 is fixed and sealed so that heated liquid passed through conduit 10 from the upper end of the receptor assembly A will flow into the container space 26 and thence through the well portion 27 and conduit 50 to the heat exchanger. During initial filling this conduit 10 and opening 30 serves also to vent air and/or vapors from the receptor flow circuit.

For the return flow of liquid from the heat exchanger via conduit 12, a length 52 of tubing to constitute a part of this conduit is arranged to extend within and along the tubular extension 40 and thence through the container space 26 and the side wall 24 for connection with respective parts of the conduit 12 located over and beneath the roof R. The tubing length 52 may also consist, for example, of PVC tubing having an internal diameter of about ⅜ inch. In the embodiment shown, it extends upwardly through the well portion 27 from an opening 53 in the bottom wall 48, being sealed in this opening, and makes a bend in the chamber 26 from which it extends through a port 54 in the front wall portion 25 for connection with a part of conduit 12 leading to the lower end of the receptor assembly A.

The portion of the tubing 52 which extends through the port 54 may be fixed and sealed in the port, as illustrated in FIG. 3, by means of hubbed circular flanges 56 and 57 which are fitted over and set in place on the tubing so that they bear against the opposite sides of wall portion 25, with an adhesive sealing composition filling crevices between these flanges and the tubing portion in the port 54. FIG. 3A illustrates an alternative arrangement in which a piece or stub 58 of tubing extends through and is sealed in a port in the side wall so that tubing runs may be connected to its projecting end portions by clamps 59.

A second length 60 of suitable tubing extends through the chamber and conduit device 20 in substantially the same manner as the tubing length 52, to constitute part of a conduit 17 which connects the sealed cover space(s) S over the radiation receptor(s) with a desiccant container D and a gas-expansion or surge chamber G located inside the building below the roof R. The surge chamber G may be, for example, an expansible and contractible balloon-like chamber. This second tubing length 60 may consist, for example, of a PVC tubing having an internal diameter of about ¼ inch. As shown, it extends upwardly through well portion 27 from an opening 62 in bottom wall 48, being sealed in that opening, and makes a bend in chamber 26 from which it extends through a port 64 in the front wall portion 25 for connection with a part of conduit 17 leading to the cover space(s) S. The tubing portion in port 64 may also be fixed and sealed in place in the manner illustrated in FIG. 3 or 3A.

Alternatively, the inlet 30 for the heated liquid and port for tubing lengths extending through the device 20 may be provided by a single flanged thimble having three ports in a nested or concentric arrangement, enabling this thimble to be fixed and sealed in a single opening in the container side wall.

The container formed by the side wall 24 is provided with a cover 28 which fits down over its upper end and is held in place, for instance, by screws 29. The cover excludes rain or snow yet keeps the chamber 26 vented to the atmosphere so that liquid in the chamber is free to expand and contact with changes of the temperature and volume of the liquid filling the solar heat collecting system.

The described apparatus for collecting solar heat as utilized with the combined chamber and conduit device herein set forth requires only a single opening, such as opening 23, through the roof or other structure supporting the radiation receptor assembly. The device 20 can be installed simply by sealing the base member 22 in place on the roof, with the tubular portion 40 extending down through the opening 23, and connecting elements of the device as above described with the respective conduits or tubing parts over and beneath the roof.

These connections having been made, the solar radiation receptors and their flow circuit can be filled with the heat collecting liquid by pouring the liquid into chamber 26 and well 27 until all or nearly all of the air has been displaced from the system through conduit 10 and opening 30 and the liquid has reached a level in chamber 26 higher than the locations therein of the liquid inlet opening 30 and the bend of tubing length 52. This liquid level then determines the hydrostatic pressure acting on the layer(s) of liquid held across the path of sunlight in the radiation receptor(s), which pressure ordinarily is kept lower than 5 pounds per square inch of receptor surface so that it will not be sufficient to distort or rupture the radiation receptor(s).

In the use of the installation, solar heat collected in the thin layer(s) of liquid in the receptor(s) brings this liquid above a preset minimum temperature level, whereupon the low pressure pump $P_1$ is activated, for instance by a control $C_1$ responding to a signal from a temperature sensor at the upper end of the receptor assembly A. This signal may be carried by a conductor (not shown) passed through the roof R in the tubing length 60. The pump $P_1$ circulates the heat collecting liquid in the receptor flow circuit, causing the liquid heated by the solar radiation to flow from the upper end of the radiation receptor(s) via conduit 10 and inlet 30 into chamber 26, then to pass downward from chamber 26 through the well portion 27 and conduit 50 to and through the pump $P_1$ and the shell side of the heat exchanger H, and then to flow back through conduit 12, via tubing length 52 extending through device 20, for return into the receptor(s) at their lower end. When the heat exchanger H is at a suitable temperature level, water is circulated through its tube side by a high pressure pump $P_2$ so as to be heated by heat exchange with the circulating solar heated liquid. The water so heated may be conducted away or into a tank for use or may be accumulated in a heat storage reservoir R.

The radiation receptor assembly A of course undergoes very considerable changes of temperature in the course of diurnal cycles of the sun. These changes cause changes of the density of the air or other gas in the cover space(s) S of the radiation receptor(s), with corresponding changes of gas volume which are accommodated by breathing flows of the gas between the cover space(s) and the surge chamber G through the tubing 17 which traverses the roof R via the tubing length 60 in device 20.

While the invention has been described and illustrated with reference to the particulars of a preferred form of embodiment thereof, it will be apparent that the new features herein set forth may also be employed in other forms while still utilizing the substance of the invention which is intended to be defined by the appended claims.

What is claimed is:

1. A roof-mountable combined chamber and conduit device for an apparatus for collecting solar heat, which apparatus includes at least one substantially planar radiation receptor mounted on a sloped support structure such as a roof and adapted to confine liquid in a thin layer across a path of solar radiation, conduit means for conducting liquid heated in said receptor in a flow circuit from the receptor to a heat exchange zone beneath said support structure and thence back into the receptor, and a chamber for holding liquid in communication with and at an elevation higher than the liquid in said receptor so as to permit expansion and contraction of the liquid while keeping said receptor and said circuit filled with the liquid under a limited hydrostatic pressure, said device comprising a liquid impermeable base member sealable upon said support structure about an opening therethrough, a side wall upstanding from said base member and forming said chamber, a tubular extension depending from said base member and forming a wall portion of said chamber extending through said opening, an inlet through said side wall for passing liquid heated in said receptor into said chamber from a part of said conduit means, and an outlet from the lower end of said extension for downflow of said heated liquid into a part of said conduit means leading to said heat exchange zone, whereby said device will serve for initial filling of said receptor and said flow circuit with liquid, for venting air and vapors therefrom and, during operation, as said expansion chamber and as a roof-traversing part of said conduit means.

2. A device according to claim 1, further including at least one length of tubing each of which extends along said tubular extension from its lower end and through said chamber and said side wall for conducting fluid between components of said apparatus respectively over and beneath said support structure.

3. A device according to claim 1, further including a length of tubing adapted to form a part of said conduit means for conducting liquid from said heat exchange zone back into said receptor and a length of tubing adapted to form part of a conduit for conducting gaseous fluid between a sealed cover space over said receptor and a surge chamber beneath said support structure, each said length of tubing extending along said tubular extension and through said chamber and through and in sealed relation to a respective port in said side wall.

4. A device according to claim 1, said base member being substantially flat and sloped relative to said upstanding side wall at a pitch fitting the slope of said support structure, said extension depending from said base member in a lowermost region of said space.

5. A roof-mountable combined chamber and conduit device for an apparatus for collecting solar heat, which apparatus includes at least one substantially planar radiation receptor mounted on a sloped support structure such as a roof and adapted to confine liquid in a thin layer across a path of solar radiation, conduit means for conducting liquid heated in said receptor in a flow circuit from the receptor to a heat exchange zone beneath said support structure and thence back into the receptor, and a chamber for holding liquid in communication with and at an elevation higher than the liquid in said receptor so as to permit expansion and contraction of the liquid while keeping said receptor and said circuit filled with the liquid under a limited hydrostatic pressure, said device comprising a liquid impermeable base member sealable upon said support structure about an opening therethrough, a side wall upstanding from said base member and forming said chamber, a tubular extension depending from said base member and forming a wall portion of said chamber extending through said opening, an inlet through said side wall for passing liquid heated in said receptor into said chamber from a part of said conduit means, and an outlet from the lower end of said extension for downflow of such heated liquid into a part of said conduit means leading to said heat exchange zone, whereby said device will serve for initial filling of said receptor and said flow circuit with liquid, for venting air and vapors therefrom and, during operation, as said expansion chamber and as a roof traversing part of said conduit means, said base member being a substantially flat sheet of weather resistant material extending laterally away from said side wall at all sides thereof so as to be sealable upon said support structure about said opening as a weatherproof flashing.

* * * * *